United States Patent [19]

McGinnis

[11] 4,052,280
[45] Oct. 4, 1977

[54] UV CURING OF POLYMERIZABLE BINDERS

[75] Inventor: Vincent D. McGinnis, Valley City, Ohio

[73] Assignee: SCM Corporation, New York, N.Y.

[21] Appl. No.: 629,295

[22] Filed: Nov. 6, 1975

[51] Int. Cl.² .............................. C08F 8/00; C08F 2/46
[52] U.S. Cl. ............................ 204/159.14; 96/115 R; 204/159.13; 204/159.18; 204/159.19; 427/53; 427/54; 428/458; 428/461; 428/474; 428/480; 428/500; 428/913
[58] Field of Search ...................... 204/159.14, 159.18, 204/159.12, 159.13, 159.19, 159.21; 96/115 R

[56] References Cited

U.S. PATENT DOCUMENTS

| | | | |
|---|---|---|---|
| 3,776,737 | 12/1973 | Williams et al. | 96/115 R |
| 3,817,876 | 6/1974 | Fukutani et al. | 260/2 A |
| 3,912,606 | 10/1975 | Pacifici et al. | 204/159.15 |
| 3,915,824 | 10/1975 | McGinniss | 204/159.23 |
| 3,926,638 | 12/1975 | Rosen et al. | 96/115 R |

Primary Examiner—Murray Tillman
Assistant Examiner—Thurman K. Page
Attorney, Agent, or Firm—Thomas M. Schmitz

[57] ABSTRACT

An improved polymer and process for ultraviolet (UV) curing of ethylenically unsaturated polymer binders containing UV sensitizers wherein the improvement comprises incorporating the UV photosensitizer into the polymer backbone. The photosensitizer is spaced in the polymer structure from the ethylenic double bond by the intervening polymer chain. The predetermined spacing of UV sensitizer from the double bond in the polymer provides excellent substrate adhesion as well as improved UV curing.

6 Claims, 3 Drawing Figures

UV CURING OF POLYMERIZABLE BINDERS

BACKGROUND OF THE INVENTION

This invention pertains to an improvement in a process for curing ethylenically unsaturated vehicles used as binders for pigments and fillers in surface coatings as well as clear non-pigmented paint films.

It is well known that conventional convection ovens or infrared ovens or other heat sources may be used to heat cure or polymerize various polymeric binders used in surface protective coatings wherein curing is promoted by a catalyst provided in the coating system. More recently, however, a broad spectrum of ultraviolet wave energy curing has been suggested for polymerizing binders wherein suitable ultraviolet sensitizers are incorporated in the coating system for initiating polymerization of the binder. The UV sources ordinarily produce wavelengths in the UV spectrum that are transmittable through a quartz and generally provide useful wavelengths between about 1600 Angstroms and about 4000 Angstroms. Typical UV emitters include various electric arc lamps, the plasma arc torch described in U.S. Pat. No. 3,364,387. The subject matter of the foregoing references are incorporated herein by reference.

It now has been found that UV curing of ethylenically unsaturated binders can be substantially improved by incorporating a UV sensitizer into the polymer backbone wherein the polymer structure is an ordered polymer design such as a block or star polymer. The UV photosensitizer is pendantly attached to a polymer chain and particularly spaced in the polymer from the ethylenic unsaturation by providing the UV sensitizer as being pendantly attached to a second polymer chain. The polymers are particularly formed in a step-wise process to space the UV sensitizer in the polymer from the ethylenic double bond whereupon curing with ultraviolet radiation until the paint coating is hard and tackfree provides excellent adhesion of the coating to the substrate.

Accordingly, a primary objective of this invention is to incorporate a UV sensitizer into the polymer backbone and specifically space the sensitizer from the ethylenic unsaturation by the intervening polymer structure.

A further advantage is to provide a substantially improved UV curing process for room temperature curing of polymers with UV sources wherein loss of UV sensitizer is avoided by incorporating the UV sensitizer into the polymer backbone. Other advantages include suppressing volatilization of solvents; improving the color and avoiding degradation of the protective film; avoiding degradation of substrates such as plastic, paper, or fabric. Room temperature UV and laser curing is rapidly promoted and highly efficient even though the film is fairly thick, high pigmented and/or heavily filled with inerts.

These and other advantages of this invention will become more apparent from the detailed description of the invention.

SUMMARY OF THE INVENTION

The polymeric composition comprises an ethylenically unsaturated binder containing ultraviolet sensitizer in the polymer backbone wherein the polymer is specifically designed to have the UV sensitizer spaced from the ethylenically unsaturation by an intervening polymer chain. The polymer can be efficiently cured by exposure to ultraviolet energy without the addition of further UV sensitizers to provide a fully cured paint film having excellent adhesion to the substrate.

IN THE DRAWINGS

FIG. 1 is a block diagram illustrating generally a polymer structure having a pendant photosensitizer spaced from the double bond by the intervening polymer structure;

FIG. 2 is a block diagram showing more specifically a trifunctional component in the polymer wherein one polymer chain contains a pendant photosensitizer and a second polymer chain contains a pendant ethylenic double bond; and FIG. 3 is a block diagram illustrating tetrafunctional polymer branching wherein one polymer chain contains a photosensitizer and one polymer chain contains an ethylenic double bond.

DETAILED DESCRIPTION OF THE INVENTION

Figure 1:
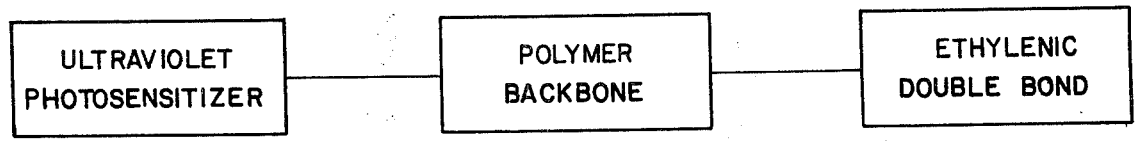

Ultraviolet energy is utilized to cure or crosslink ethylenically unsaturated binders to provide clear, non-pigmented coating as well as protective coatings filled with pigments, fillers, and other inorganics to provide a hard and tackfree opacified paint film.

The polymerizable ethylenically unsaturated binder useful for this invention are those generally known as ethylenically unsaturated binders which are photocurable by free radical induced addition polymerization using peroxy or azo-catalysts for a redox system to produce a hard, tackfree surface by addition polymerization of the ethylenic unsaturation in the polymers. The binders can be fluid material wherein the ultraviolet energy causes photochemical generation of a catalytic material of effects rearrangement to induce free radical addition polymerization through the ethylenic unsaturation in the polymer chain. The polymers are specifically designed to provide a UV sensitizer in the polymer spaced from the ethylenic unsaturation by the intervening polymer chain wheein the UV sensitizer induces free radical addition polymerization of the ethylenic unsaturation in the polymer chain. It is believed that by specifically spacing the UV sensitizer pendant on a polymer chain and spaced from the ethylenic double bond effectively provides sufficient polymer chain length between crosslinking sites whereby adhesion is surprisingly substantially increased due to flexibility and continuous adhesion of the polymer chain to the substrate without intervening crosslinking. Increased adhesion due to spacing the crosslinking sites is believed to be enhanced even more by the surface active properties of photosensitizers which function most efficiently by being spaced from the polymer double bond.

The invention is particularly advantageous in efficiently utilizing UV energy wherein the quantum efficiency is of the order of between about 60–1000 ethylenic crosslinks per photon of energy to effectively produce crosslinking of the ethylenic unsaturation by addition polymerization free radical propagation. The addition polymerization through ethylenic unsaturation in accordance with this invention is quite distinguishable from free radical chain polymerization activated by dissociation of a free hydrogen which crosslinks with a similar free radical chain wherein the polymerization depends upon readily extractable hydrogens and approximately placed free radicals. Free radical abstraction involves a quantum of light energy to release a free hydrogen radical (H) and a free radical chain which polymerizes by connecting with still another free radical whereby polymerization is restricted by the availability of at least two free radical chains. In contrast to this invention, the quantum efficiency of free radical polymerization is less than one crosslink per one photon and quite often between 0.3 to 0.7 per free radical crosslink per photon as described more particularly by C. H. Bamford, "Reactions on Polymers," Reidel Publishing Co., 1973.

Figure 2:
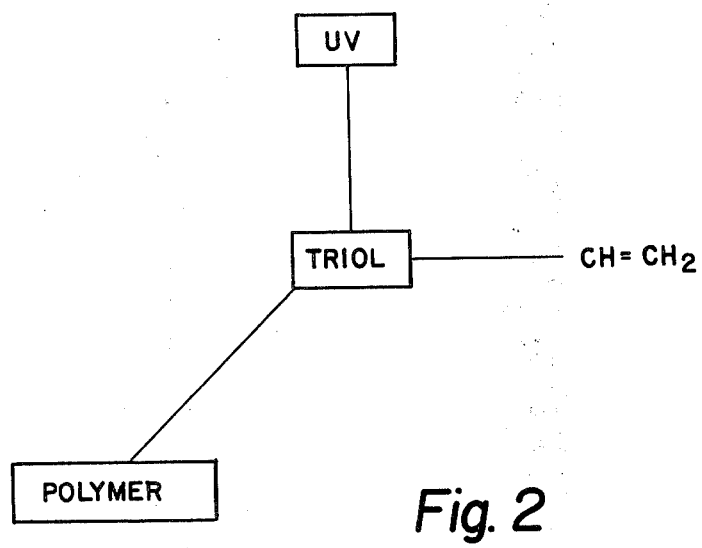
Figure 3:
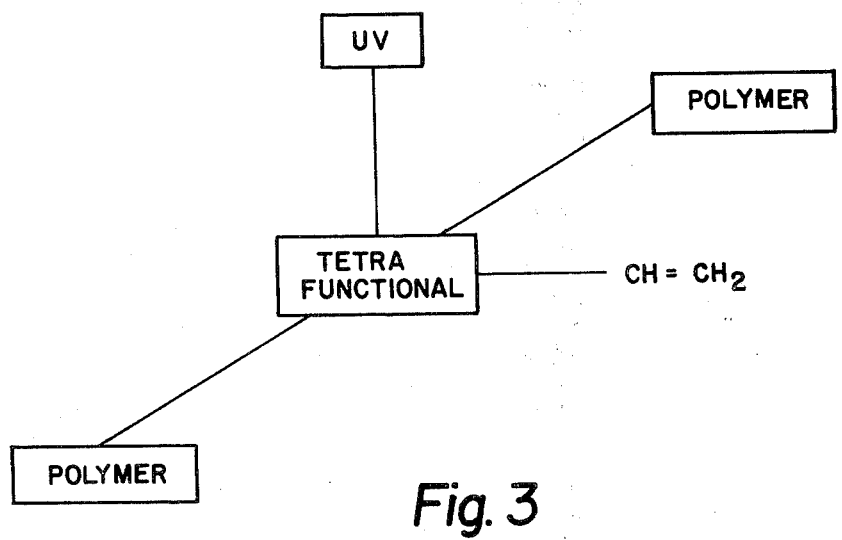

With reference to the drawings, the polymer structure is illustrated in FIG. 1 as being a linear polymer backbone having a pendant ethylenic unsaturated double bond spaced from the pendant UV photosensitizer by the intervening polymer backbone. FIG. 2 similarly illustrates a preferred polymer structure wherein a triol or other trifunctional branching member generates a plurality of polymer chains wherein one polymer chain contains an ethylenic double and a second polymer chain contains a UV sensitizer. Triols such as trimethylolpropane or triethylene propane are the most common and preferred branching component although triisocyanates and triacids can provide chain branching. FIG. 3 illustrates tetrafunctional polymer chain branching wherein a tetrapolyol such as pentaerythritol generates at least two polymer chains wherein one chain contains the ethylenic double bond and the other chain contains the photosensitizer.

Examples of useful polymerizable binders in accordance with this invention are polymeric materials especially those exhibiting polymerizable vinyl, acrylic, allylic, fumaric, maleic ethylenic double bond unsaturation. Reactive polymers include unsaturated polyesters, acrylics, epoxies, urethanes, silicones, amines, polyamide resins, and particularly acrylated resins such as acrylated silicone oil, acrylated polyester, acrylated urethanes, acrylated polyamides, acrylated soybeam oil, acrylated epoxy resin and acrylated acrylic resin. Examples of reactive ethylenically unsaturated monomers include a variety of acrylates such as hydroxyethyl acrylate, cyclohexyl acrylate, hydroxypropyl acrylate, hydroxyethyl methacrylate, benzyl acrylate, 2-ethylhexyl acrylate, benzeol, phenyloxyethyl acrylate, lower alkoxy ethoxy acrylate, tetrahydrofurfuryl acrylate, n-vinyl pyrrolidone vinyl acetate, styrene and substituted styrenes. Examples of ethylenically unsaturated binders include oligomers such as trimethylolpropane diacrylate and triacrylate, ethylene glycol diacrylate and dimethacrylate, propoxylated bisphenol A diacrylate and dimethacrylate, and 1,6 hexane diol diacrylate pentaerythritol triacrylate.

In accordance with this invention, ultraviolet sensitizer can be incorporated into the ethylenically unsaturated polymer structure by reacting the UV sensitizer with a reactive group on the polymer chain to produce an ultraviolet curable polymer containing at least about 2% by weight and preferably between about 3% to 20% by weight photosensitizer. Preferred photosensitizers found useful for incorporating into the polymer structure in accordance with this invention are carboxylated phenyl nuclear ketones which generally can be selected from benzaldehydes, acetophenones, and benzophenones. Particularly useful carboxylated phenyl nuclear ketone sensitizers include, for example, ortho-, meta-, and para-hydroxy-acetophenone; 3-hydroxy-para-aminobenzaldehyde; 2-hydroxy-5-methoxybenzaldehyde; 2-(para-hydroxybenzoyl)-benzoic acid; ortho- and para-hydroxybenzophenone; 2-hydroxy-4-methoxybenzophenone; and 3,3', 4,4'-benzophenone tetracarboxylicdianhydride. Other suitable photosensitizers include: benzoin; 2-benzoylbenzoic acid; 4'-methylbenzophenone 2-carboxylic acid; 4-ethylbenzophenone 2-carboxylic acid; 4'-chlorobenzophenone 2-carboxylic acid; 3'-chloro-4'-methylbenzophenone-2-carboxylic acid; 3'-nitro-4'-chloro-benzophenone-2-carboxylic acid; 2, 3, and 4 hydroxy acetophenone; 5-chloro-2-hydroxy benzophenone; 2-(4-hydroxy-benzoyl)-benzoic acid; 2 and 4-hydroxy-benzophenone; 2-hydroxy-4-methoxy-benzophenone; 3-hydroxy-para-anisaldehyde; 2-hydroxy-5-methoxy-benzaldehyde; 3-chloro-4-hydroxy 5 methoxybenzaldehyde; 4'-chloro-2-hydroxy-4-methoxybenzophenone; 5-chloro-2-hydroxy-4-methylbenzophenone; 2-N-methylaminobenzophenone; 4-N-methylaminobenzophenone; 2-N-methylaminoacetophenone; 3-N-methylaminoacetophenone; 4-N-methylaminoacetophenone; and 2-mercaptobenzophenone, and others as identified in the examples.

Aromatic amino carbonyl photosensitizers can be similarly incorporated into the polymer backbone by including about 5% by weight aromatic amino carbonyl group in the polymer. In synthesizing an aromatic amino carbonyl group into a polyester resin, for example, a diol of paramino benzophenone is esterified together with standard glycols and diacids. Similarly, an isocyanate reacted with diol paramino benzaldehyde or paramino benzophenone or the like may be incorporated into the urethane polymer backbone. Useful synergist-producing diols may be produced, for example, by reacting active hydrogens on the amine of the amino carbonyl compounds with excess ethylene or propylene oxide to N-substituted diethanol or dipropanol compounds. Other polymers such as acrylics, epoxies, silicones can be similarly synthesized. The aromatic or aldehyde sensitizers can be similarly incorporated into the polymer backbone. The sensitizer, for example, should contain a hydroxy or carboxy functional group for reacting with conventional reactants to produce polymers containing aromatic ketone or aldehyde sensitizer group in the polymer backbone. At least about 2% of the polymer weight is UV sensitizer and preferably between about 3% to 20% of the polymer is sensitizer.

Useful ultraviolet photosensitizers that can be incorporated into the polymer backbone further include halogenated polynuclear ketones selected from chlorosulfonated benzanthones, chlorosulfonated fluorenone, alpha-haloalkylated benzanthrones, and alpha-haloalkylated fluorenone, as disclosed in U.S. Pat. No. 3,827,957 and incorporated herein by reference. The benzanthrones can be selected from chloromethyl benzanthrone; sulfonyl chloride benzanthrone; 1,6-dichlorosulfonyl benzanthrone; isodibenzanthrone sulfonyl chloride; and dichlorosulfonyl-16,17-dibenzanthrone. The fluorenones can be selected from 2-bromomethyl-9-fluorenone sulfonyl chloride; chloromethyl-9-fluorenone-6,7 dichloro-alpha-bromofluorenone sulfonyl chloride; and 1-chloro-2-ethyl-9-fluorenone sulfonyl chloride.

Other suitable ultraviolet sensitizers that can be attached to the polymer chain further include organic carbonyl compounds selected from alkylphenones, benzophenones, and tricyclic fused ring compounds, as disclosed in U.S. Pat. No. 3,759,807 and incorporated herein by reference. Particularly desirable organic carbonyl photosensitizers can be selected from diethoxyacetophenone, benzoin, xanthone, thio-xanthone, anthraquinone, and acetonaphthone. Other suitable ultraviolet sensitizers include carbonylated phenyl nuclear sulfonyl chlorides such as meta-benzophenone monosulfonyl chloride, meta-acetophenone monosulfonyl chloride, and meta-benzaldehyde monosulfonyl chloride are particularly suitable for pigmented coatings as more particularly set forth in U.S. Pat. No. 3,827,959 and incorporated herein by reference. Other suitable photosensitizer combinations particularly suitable for pigmented coatings are a combination of sensitizers comprising aromatic carbonyl compounds, aromatic aldehydes or aromatic ketones, incorporated into the polymer backbone and used in combination with a synergistic sensitizer of about 0.05% to 3% 2,2'-dithiobis(-benzothiazole) as more particularly set forth in U.S. Pat. No. 3,847,771.

In accordance with the invention, the sensitized ethylenic polymers are produced in a step-wise process to avoid random orientation and assure substantially ordered polymer design structure wherein both the UV sensitizer and ethylenic unsaturation are pendant on the polymer and having a linear polymer chain intervening between the sensitizer and the double bond. A prepolymer is first formed by co-reacting monomer units to produce a linear polymer chain having pendant reactive functional groups that can be further reacted with a UV sensitizer and a vinyl monomer in a step-wise process to assure spacing of the UV sensitizer and the ethylenic double bond in the polymer. The prepolymer has molecular weight of at least about 100 and preferably between 300 to 3000 to provide a suitable linear polymer between the UV sensitizer and the double bond. The prepolymer linear chain can be repeating units $(X)_n$, wherein $n$ is greater than 1 and preferably between about 2 to 50 repeating units. The prepolymer contains excess equivalents of reactive groups wherein lesser equivalents UV photosensitizers are first reacted therewith followed by a second stage reaction with a vinyl monomer although the step-wise process can be reversed by co-reacting the vinyl monomer onto the prepolymer first followed by co-reacting UV sensitizer. The step-wise processing is critical to avoid random polymer design which can result when both the UV sensitizer and the ethylenic monomer are co-reacted simultaneously with either the prepolymer or the prepolymer monomer units. The sensitized ethylenic polymer can be a star-polymer containing two or more polymer chains having ethylenic unsaturation in one linear chain length and the UV sensitizer in the other polymer chain whereby the linear polymer chain or chains interposed between the pendant UV sensitizer and the ethylenic double bond appears to effectively provide substrate surface activity and substantial adhesion of the cross-linked polymer chains to the substrate.

The UV curable binder can contain opacifying pigments and inert extenders such as, for example, titanium dioxide, zinc oxide, leaded zinc oxide, white lead, titanium calcium, clays such as kaolinite clays, silica, talc, mica, wollastonite, chromates, iron pigments, wood flower, microballoons, and glass fiber or flake. Generally, it is desirable to use pigments which do not absorb considerable ultraviolet light in the same region of the UV spectrum as is absorbed by the synergistic sensitizer 2,2'-dithiobis-(benzothiazole).

The following examples further illustrate and explain the invention.

EXAMPLE 1

A UV curable coating composition (control) having a UV sensitizer not part of the polymeric structure was produced by blending together 1 part of hydroxyethyl acrylate, 1 part of 2-ethyl hexyl acrylate, 1 part of pentaerythritol triacrylate, and 1 part of an ethylenically unsaturated polyester polymer in accordance with the method suggested in U.S. Pat. No. 3,856,744. The above coating composition was mixed with 12% benzophenone and 6% methyl diethanolamine by weight. A coating film of 1 mil was applied to an aluminum panel with a No. 8 WW rod and cured under a 3 bulb Ashdee UV curing unit until the film was tackfree and fully cured (cure speed 100 ft./min.). The film had negligible (0%) adhesion to the panel substrate after UV radiation and baking to a full cure at 400° F. 10 minutes resulted in a volitile loss of 20 %.

EXAMPLE 2

A random acrylate unsaturated photosensitive polymer was produced as follows. One mole of a styrene-allyl alcohol copolymer (RJ-100) having hydroxyl functionality of 5.2 and molecular weight of approximately 1,000 was transesterified in a random manner with methylbenzoylbenzoate and ethyl acrylate. This modified resin contained random distribution of 2 moles of acrylic unsaturation and approximately one mole of UV photosensitizer. The resin material was applied to a metal panel and tested as in Example 1. A complete cure was obtained at a conveyor speed of 100 ft./min. below the UV source. Adhesion of the random photosensitive polymer was essentially 0%.

EXAMPLE 3

One mole of 2-benzoylbenzoic acid was reacted with excess molar propylene oxide to produce a 2-hydroxyl-1-propylbenzoyl benzoate. Excess propylene oxide was vacuum stripped, and the resulting resin product had an acid number of about zero. The adduct was then further reacted with one mole of phthalic anhydride followed by further reaction with 4 moles of propylene oxide and 5 moles of phthalic anhydride to produce an acid-terminated polyester resin which was then reacted with glycidyl acrylate to produce an acrylic-terminated block polyester polymer having a UV sensitizer pendant on the polymer backbone and spaced from the pendant acrylic unsaturation. This polymer is essentially a polyester polymer having one end capped with a UV photosensitizer and the other end capped with acrylic unsaturation. The resin material was applied to a test panel and tested in the manner of Example 1. Adhesion by x-hatch adhesion of the ordered block polymer was greater than 50%.

EXAMPLE 4

A random distribution of photosensitizer in a polyester resin was prepared with one mole of 4,4'-dicarboxybenzophenone in a fusion cook with 5 moles of propylene glycol and 5 moles of phthalic anhydride and one mole of glycidyl acrylate. The resin material was drawn down onto a steel panel and cured in a manner similar to Example 1. The random photosensitive unsaturated polyester had only 10% X-hatch adhesion after cure.

EXAMPLE 5

One mole of trimethylopropane was reacted with three moles of phthalic anhydride to form a star-shaped tri-chain prepolymer structure. The prepolymer was then further reacted with 4 moles of propylene oxide and 5 moles of phthalic anhydride to produce an acid-terminated star-shaped polyester and thereafter reacted with 2 moles glycidyl acrylate. This polymer was then reacted with one mole of the reaction product of p-hydroxy benzophenone reacted with excess epichlorohydrin in base to produce an ordered star-shaped polymer having two polymer chains containing pendant ethylenic acrylic unsaturation and the third polymer chain containing a pendant UV photosensitizer. This star-shaped polymer was cured in the manner set forth in Example 1. The film had excellent adhesion to the substrate.

EXAMPLE 6

A polymer similar to Example 5 was produced except a tetra-chain ordered structure polymer was produced by utilizing pentaerythritol instead of trimethylol propane. A tetra-chain polymer resulted wherein two chains contained pendant acrylic unsaturation, one chain contained a pendant UV sensitizer, and the fourth chain remained capped with phthalic acid. A 1 mil film was cured with a 3 bulb Ashdee lamp at 100 ft./min. under thr same conditions of Example 1 and the film had very good adhesion.

EXAMPLE 7

In contrast to Examples 5 and 6, a random polymer (alkyd) was synthesized with the same components wherein both the acrylate and UV sensitizer were randomly connected to the polymer chain. A 1 mil film was cured by the same Ashdee UV source under the same conditions as Example 4 but required double the time or 50 ft./min. conveyor speed for a full cure. The film had negligible adhesion to the test panel.

EXAMPLE 8

An ordered structure polyurethane was produced by reacting one mole of UV sensitizer of benzoyl benzoic acid with excess propylene oxide until an Acid No. of zero was obtained. The excess propylene oxide was removed. One mole of reaction product of 2-hydroxy ethylacrylate + toluene diisocyanate was then reacted to produce a polyurethane polymer structure having pendant UV sensitizer and pendant acrylic unsaturation wherein the UV sensitizer and acrylic unsaturation are pendantly spaced by the intervening polyurethane link. The resin was tested in accordance with Example 1 and produced excellent adhesion to the panel substrate.

EXAMPLE 9

Star-shaped urethane photosensitive, unsaturated polymers were made by the direct esterification of (one mole) 2-benzoylbenzoic acid with trimethylolpropane followed by further reaction with two moles of the reaction product of 2-hydroxyethylacrylate and isophoronediisocyanate. This polymer was cured in the manner set forth in Example 1 and produced excellent adhesion to the metal substrate.

EXAMPLE 10

Ordered photosensitive unsaturated polymers are produced by the reaction product of one mole of α-hydroxyacetophenone or one mole of benzoin with one mole of succinic anhydride followed by further reaction with 4 moles of phthalic anhydride, 4 moles of propylene oxide, and one mole of glycidyl acrylate. This resin system cured without the aid of an amine synergist. Excellent adhesion to a metal panel substrate was achieved.

EXAMPLE 11

Ethylenically unsaturated binders were synthesized in a conventional manner as follows. Siloxane-ester-acrylate resins were produced by reacting a diepoxy resin with acrylic or methacrylic acid to give a hydroxyalkyl acrylate epoxy resin which was then reacted with a 4 to 10 carbon dicarboxylic anhydride and a 2 to 21 carbon atom diol. The resulting polyester was then reacted with a siloxane having 2 or more OH and/or alkoxy groups. Similarly, acrylated-amide resins were synthesized by reacting glycidyl acrylate or glycidyl methacrylate reacted with the –COOH groups of an acid-terminated aliphatic polyamide in a manner described in British Pat. No. 1,241,622. Acrylated polyester resins were synthesized from a standard polyester such as propylene glycol reacted with excess molar phthalic anhydride to provide an acid-terminated polyester which was thereafter reacted with glycidyl acrylate or glycidyl methacrylate. In like manner, acrylated-acrylic resins were produced by reacting a standard acrylic resin containing pendant oxirane functionality with acrylic acid to produce an ethylenically unsaturated resin wherein glycidyl methacrylate, methylmethacrylate and butyl acrylate copolymerized in solution and thereafter reacted with acrylic acid. Similarly, acrylated urethane resins were synthesized by reacting a diol with a diisocyanate (eg. TDI) with propylene glycol to produce an isocyanate-terminated urethane resin. The –NCO terminated resin was thereafter reacted with a hydroxyl containing acrylate such as hydroxyethyl acrylate to produce an acrylated urethane resin. Binder compositions synthesized in the foregoing explanatory manner were ground with $TiO_2$ pigment, sensitized with Michler's Ketone, 2,2'-dithiobis benzothiazole and the sensitizer combinations, as indicated in Tables I and II below, and drawn down on a steel panel in a 0.7 mil film, and exposed to a UV source in the manner indicated in Example 1. Fully cured paint films having excellent MEK resistance and excellent adhesion resulted only from those photosensitive polymers having ordered structure. In comparison, random structure polymers had poor adhesion to a metal substrate.

EXAMPLE 12

Polymers produced in a random fashion were synthesized from reactants indicated in the following Table I:

TABLE I

| | |
|---|---|
| (a) | 1 mole of 2-benzoylbenzoic acid<br>1 mole styrene<br>3 moles glycidyl methacrylate<br>2 moles butyl acrylate |
| (b) | Example (a) repeated but with the exception that 1 mole of 4-hydroxybenzophenone was reacted with the acrylic polymer in the first reaction step to introduce a UV sensitizer into the polymer. |
| (c) | The polymer of (a) was modified by reacting 1 mole of carboxythioxanthone into the acrylic polymer backbone. |

The foregoing polymers had poor adhesion properties when cured in the manner set forth in Example 1.

EXAMPLE 13

Polymers produced in an ordered structure were synthesized from reactants indicated in the following table:

TABLE II (a) 1 mole 4,4'-benzophenone tetracarboxylicdianhydride, 4 moles epoxy resin (epoxy number = 176) and 4 moles of acrylic acid
(b) 1 mole 2-hydroxy-9-fluorenone
1 mole propylene oxide
prepolymer of 1 mole TDI + 1 mole pentaerythritol triacrylate
(c) 1 mole of p-hydroxybenzophenone +
1 mole of DER 332 epoxy resin followed by further reaction with one mole of diethanol amine and one mole of the adduct of hydroxyethyl acrylate/ toluene diisocyanate
(d) 1 mole of 4-carboxybenzophenone + 1 mole of RD-2-diepoxy resin (aliphatic) followed by further reaction with one mole of diethanol amine and one mole of the adduct of hydroxyethyl acrylate/ toluene diisocyanate One mole of p-hydroxy benzophenone was reacted with one mole of propylene oxide followed by direct esterification with acrylic acid to produce an acrylated benzophenone monomer. This monomer was added to one mole of methyl ethanol amine (Michael Addition) followed by direct transesterification (sodium methoxyl) with ethyl acrylate.

The foregoing ordered structure polymers having pendant ethylenically unsaturation and a pendant UV sensitizer were cured in the manner set forth in Example 1 and produced excellent adhesion to the metal substrate.

EXAMPLE 14

Any epoxy resin or epoxy monomer having terminal epoxide groups can be reacted with the following UV sensitizers:

a. 2-hydroxy-4-methoxy benzophenone;
b. 3-hydroxy-p-anisaldehyde;
c. 2-hydroxy-5-methoxy benzaldehyde;
d. 3-chloro-4-hydroxy-5-methoxybenzaldehyde;
e. 4'-chloro-2-hydroxy-4-methoxy benzophenone;
f. 5-chloro-2-hydroxy-4-methyl benzophenone; or
g. 2-N-methylamino-benzophenone;
h. 4-N-methylamino-benzophenone;
i. 2-N-methylamino-acetophenone;
j. 3-N-methylamino-acetophenone;
k. 4-N-methylamino-acetophenone; or
l. 2-mercaptobenzophenone.

The foregoing prepolymers can be further reacted with diisocyanate, and further reacted with polymers such as epoxy, acrylic, or urethanes to produce ordered polymers containing UV sensitizers attached to the polymer backbone.

EXAMPLE 15

UV sensitizers can be introduced (in an ordered manner) into the polymer by reacting an epoxy acrylate with a monoisocyanate adduct prepared by reaction with one of the following UV sensitizers with a diisocyanate:

a. 2-hydroxy acetophenone;
b. 3-hydroxy acetophenone;
c. 4-hydroxy acetophenone;
d. 5-chloro-2-hydroxy benzophenone;
e. 2-hydroxy-benzophenone;
f. 4-hydroxy-benzophenone;
g. 2-hydroxy-4-methyloxy benzophenone;
h. 3-hydroxy-p-anisaldehyde; or
i. 2-hydroxy-5-methoxy benzaldehyde.

The foregoing examples illustrate preferred embodiments of this invention directed to ordered structure polymers containing pendant ultraviolet photosensitizers and pendant ethylenic unsaturation spaced on the polymer backbone by intervening polymer chain structure.

The detailed description and examples are not intended to be limiting except as defined by the appended claims.

I claim:

1. A protective coating composition for application of a protective coating surface film to a substrate, the coating composition containing an ultraviolet curable polymeric binder of ethylenically unsaturated polymer being reactive to ultraviolet energy and photocurable by free-radical induced addition polymerization of the ethylenic double bonds, the improvement comprising:
said ethylenically unsaturated polymer containing at least about 2% of an ultraviolet photosensitizer attached to the polymer structure; and
said ultraviolet photosensitizer being connected to the polymer structure in a spaced relationship with said ethylenic unsaturation by an intervening polymer chain having a molecular weight of at least about 100, and said intervening polymer chain having between 2 and 50 repeating polymer units.

2. The composition in claim 1 wherein said polymer is a tri-functional branched polymer structure having at least two pendant polymer chains, the first pendant polymer chain having the photosensitizer attached thereto, and the second pendant polymer chain containing the ethylenic unsaturation whereby the tri-functional branching component forms intervening polymer chains between said photosensitizer and said ethylenic unsaturation.

3. The composition in claim 1 wherein said polymer is a tetra-functional branched polymer structure having at least two pendant polymer chains connected to a tetra-functional branching component, the first pendant polymer chain having the photosensitizer attached thereto, and the second pendant polymer chain containing the ethylenic unsaturation whereby the tetra-functional branching component forms intervening polymer chains between said photosensitizer and said ethylenic unsaturation.

4. The composition in claim 1 wherein the photosensitizer attached to the polymer is selected from carboxylated phenyl nuclear ketones, aromatic amino carbonyl compounds, halogenated polynuclear ketones, and organic carbonyl photosensitizer compounds.

5. The composition in claim 1 wherein the intervening polymer chain has a molecular weight between about 300 to 3,000 and is represented by $(X)_n$ wherein X is repeating polymer units and $n$ is between 2 and 50.

6. In a process for ultraviolet curing of protective coating films onto substrates, the protective coating compositions containing ethylenically unsaturated polymers cross-linkable by free-radical induced addition polymerization through said ethylenic double bonds activated by ultraviolet energy and ultraviolet sensitizers, the improvement in the process comprising:
step-wise processing of said polymer to produce said ethylenically unsaturated polymer with an ultraviolet photosensitizer attached to the polymer structure and spaced from said ethylenic double bonds by an intervening polymer chain having between about 2 to 50 repeating polymeric units and a molecular weight of at least 100 whereby a random polymer structure is avoided.

* * * * *